US007565766B2

(12) United States Patent
Boylan

(10) Patent No.: US 7,565,766 B2
(45) Date of Patent: Jul. 28, 2009

(54) TRANSPORTABLE PLANTER APPARATUS

(76) Inventor: Carrol J. Boylan, 3410 W. 88th St., Leawood, KS (US) 66206

( * ) Notice: Subject to any disclaimer, the term of this patent is extended or adjusted under 35 U.S.C. 154(b) by 71 days.

(21) Appl. No.: 11/650,745

(22) Filed: Jan. 8, 2007

(65) Prior Publication Data
US 2008/0163544 A1    Jul. 10, 2008

(51) Int. Cl.
A01G 9/02    (2006.01)
(52) U.S. Cl. .............................. 47/65.5; 47/66.6; 47/39
(58) Field of Classification Search ............ 47/39, 47/65.5, 66.6, 65; 280/33.991, 33.998, 655, 280/655.1, 47.26; 220/908; 16/113.1, 405
See application file for complete search history.

(56) References Cited

U.S. PATENT DOCUMENTS

| 5,431,428 | A  | * | 7/1995  | Marchwiak et al. ......... 280/655 |
| 2006/0248797 | A1 | * | 11/2006 | White et al. ................. 47/66.6 |
| 2007/0022660 | A1 | * | 2/2007  | Buitendag et al. ............. 47/81 |
| 2007/0214718 | A1 | * | 9/2007  | Park .............................. 47/79 |

* cited by examiner

Primary Examiner—T. Nguyen
(74) Attorney, Agent, or Firm—Spencer Fane Britt & Browne LLP

(57) ABSTRACT

A transportable planter apparatus including a housing with a bottom and a sidewall having an edge opposite the bottom, an opening located at the edge adapted to receive a houseplant. A handle associated with the housing and fastened to an arm extends between the handle and the housing, where the arm travels between a recessed configuration and an extended configuration in which the handle extends upwardly from the housing.

1 Claim, 4 Drawing Sheets

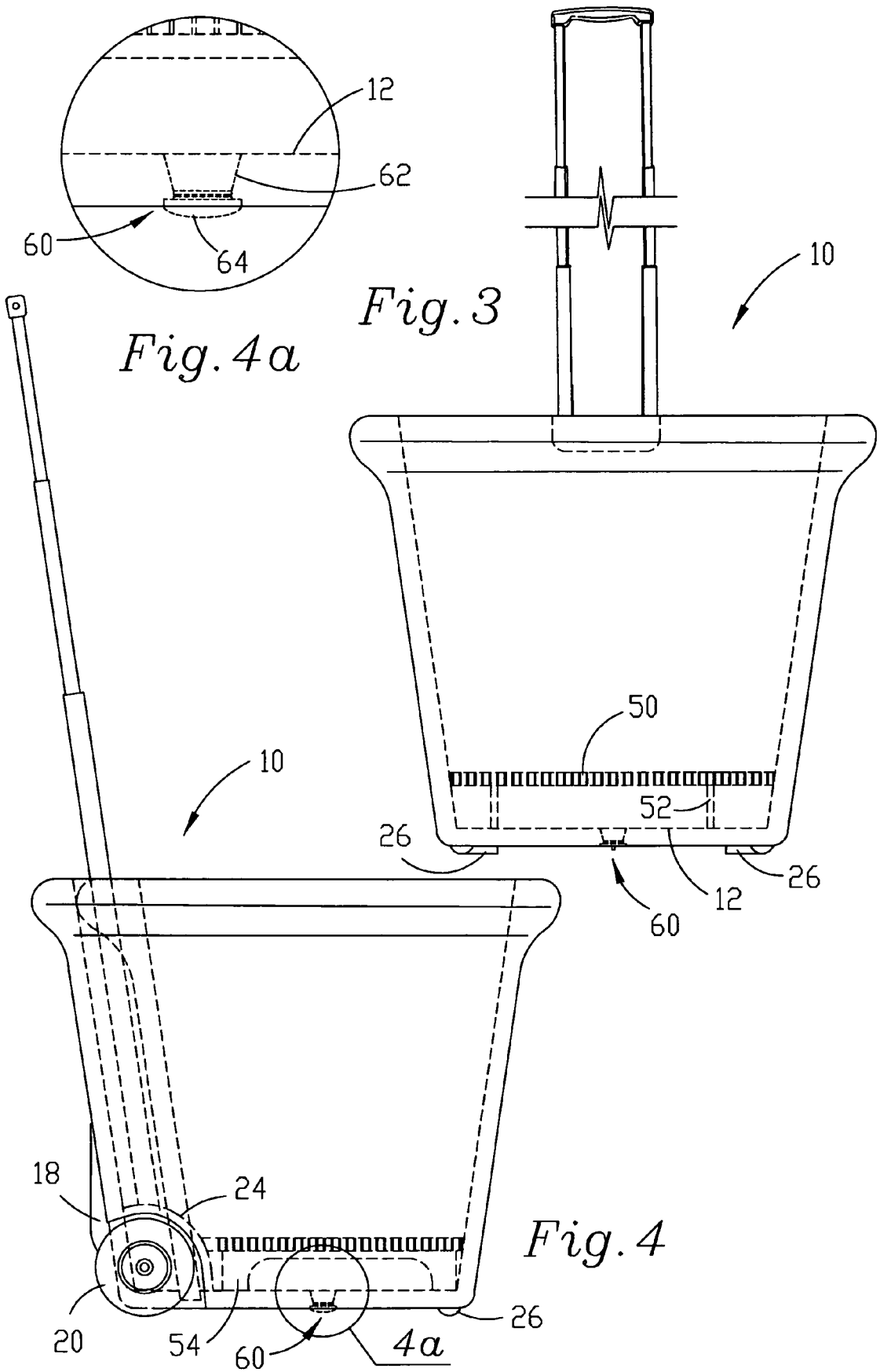

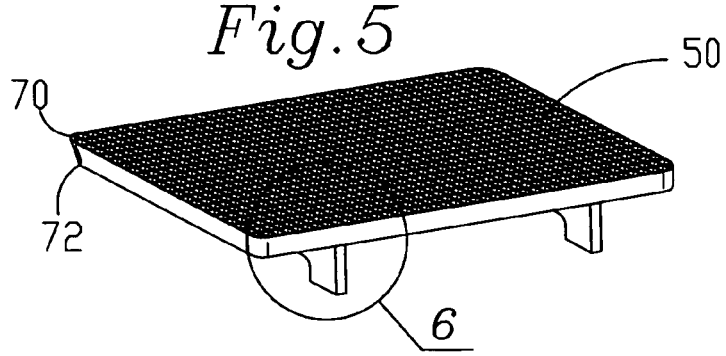
Fig.5
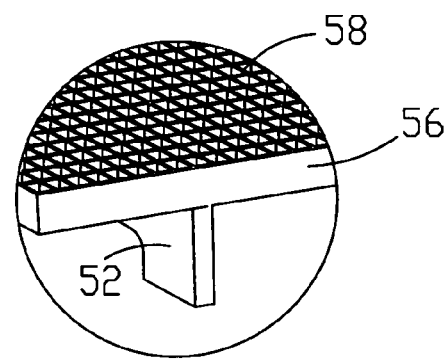
Fig.6
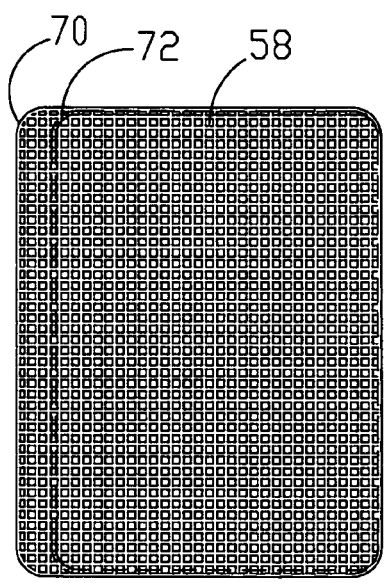
Fig.9
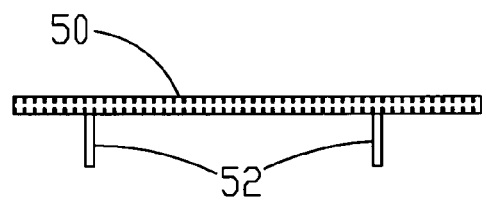
Fig.7
Fig.8

US 7,565,766 B2

TRANSPORTABLE PLANTER APPARATUS

FIELD OF THE INVENTION

The present invention relates generally to plant carriers and more particularly to an apparatus for storing and transporting a plant from one location to another.

BACKGROUND OF THE INVENTION

Different plants may be grown in a variety of locations in a variety of different climates having a variety of different light exposures. In addition, as the climate changes from season to season or in some cases from day to day, it may be desirable to move a plant from one location to another. However, conventional planters may be fixed or positioned in one particular location, lacking an ability to conveniently transport them. It would therefore be beneficial to provide a planter which allows for easy transport of the plant from one location to another.

Some plants are large and are especially difficult to transport and are cumbersome to pick-up or slide from one location to another. Additionally, if the plant must be carried up or down a flight of stairs or across a slippery surface, lifting the plant up or down the stairs or across the slippery surface may become dangerous. In some cases, the large plant may make obstruct the view, making it difficult to visually inspect the underlying horizontal surface while transporting the plant from one location to another. It would therefore be beneficial to provide a transportable planter which will maintain the plant at a safe distance with respect to the underlying horizontal surface, as well as assist in transporting the plant over slippery surfaces or up and down stairs.

In addition, plants may grow overtime becoming heavy and difficult to move or transport. Some conventional methods of transporting a plant may include utilizing a dolly or lift to move the plant back and forth. However, simply lifting the plant up the distance to place on a dolly or lift may prove too difficult. In addition, the lifting area of some dollies may be to small for lifting some plants. Also, leaving the plant on the dolly or lift, until moved may distract from the aesthetic or visual appeal of the plant. In addition, the dolly or lift may create a hazard for impact or tipping the plant over. It would therefore be beneficial to provide a transportable planter that does not need to be lifted for placement on the dolly, does not provide a hazardous extension and maintains the visual and aesthetic appearance of the plant or planter.

SUMMARY OF THE INVENTION

The present invention provides a transportable planter apparatus including a housing with a bottom and a sidewall having an edge opposite said bottom, an opening located at said edge adapted to receive the houseplant, a handle associated with said housing and fastened to an arm extending between said handle and said housing, said arm traveling between a recessed configuration and an extended configuration in which said handle extends upwardly from said housing.

BRIEF DESCRIPTION OF THE DRAWINGS

The drawings constitute a part of this invention and include exemplary embodiments of the present invention and illustrate various objects and features thereof.

FIG. 3 is a front elevational view of the apparatus in accordance with the present invention.

FIG. 4 is a side elevational view of the apparatus in accordance with the present invention.

FIG. 4a is a magnified sectional view taken along 4a of FIG. 4 of the apparatus in accordance with the present invention.

FIG. 5 is a perspective view of a plant spacer depicted in FIG. 2 in accordance with one aspect of the present invention.

FIG. 6 is a magnified sectional view of the plant spacer of FIG. 2 taken along 6 in FIG. 5.

FIG. 7 is a rear elevational view of the plant spacer of FIG. 2 in accordance with one aspect of the present invention.

FIG. 8 is a side elevational view of the plant spacer of FIG. 2 in accordance with one aspect of the present invention.

FIG. 9 is a top plan view of the plant spacer of FIG. 2 in accordance with one aspect of the present invention.

DETAILED DESCRIPTION

I. Introduction.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Transportable Planter.

Figure 1:
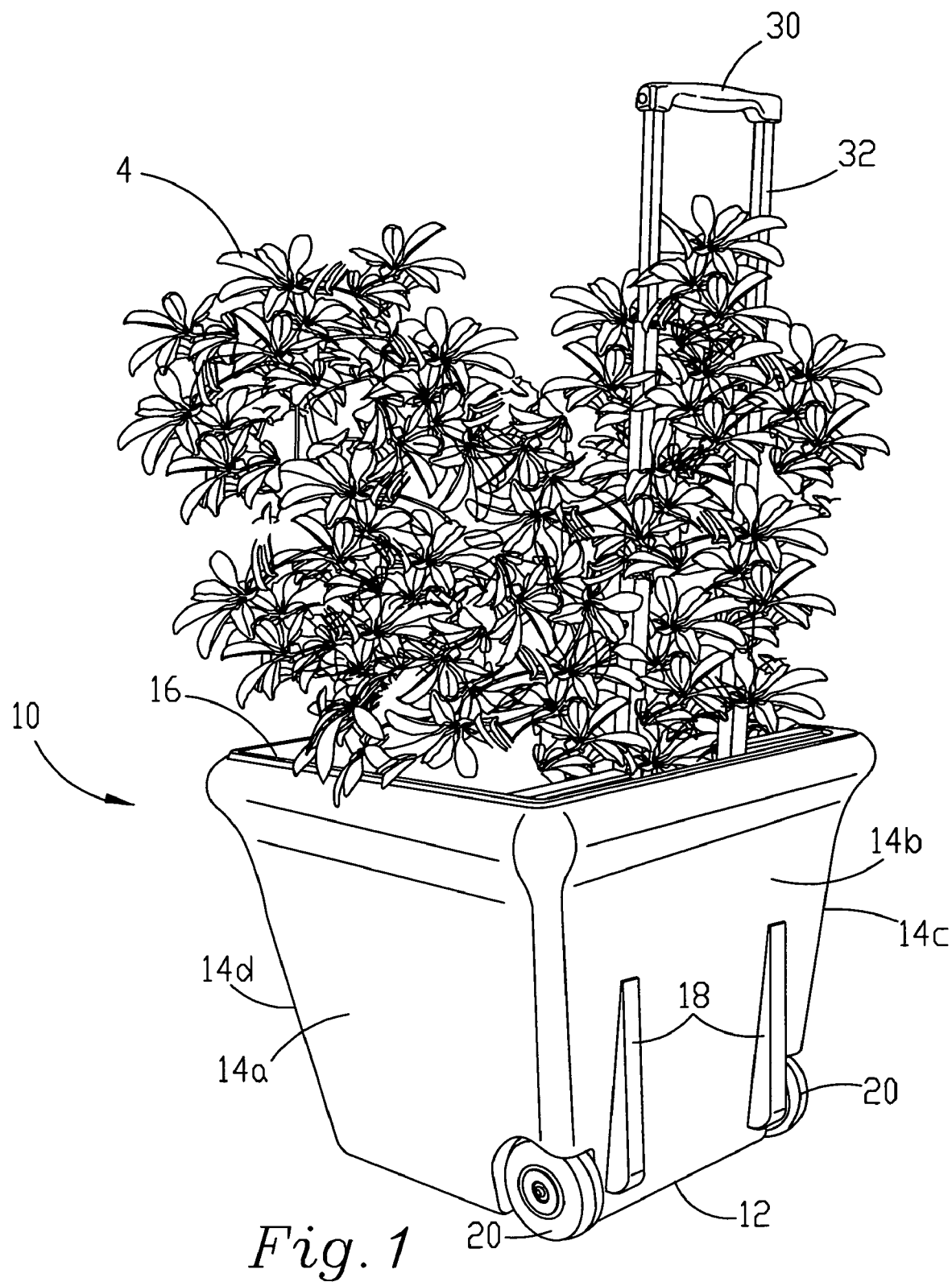
FIG. 1 is a perspective view of a transportable planter apparatus in accordance with the present invention with a plant extending outwardly therefrom.

Referring to FIG. 1, an embodiment of the present invention a transportable planter apparatus is generally indicated by reference numeral 10 with the apparatus having a sidewall 14 extending generally along the perimeter of a bottom 12 forming a housing for receiving a typical houseplant 4 which extends outwardly from an opening 16 generally located at an edge of the sidewall 14 opposite the bottom 12. As illustrated the sidewall 14 is generally rectangular with four faces referred to as a first, second, third and fourth sidewall faces 14a, 14b, 14c and 14d, the first and third sidewall faces 14a, 14c being opposite and spaced apart by said second and forth sidewall faces 14b, 14d. The sidewall 14 illustrated in FIG. 1 generally provides a trapezoidal configured apparatus 10, however, other configurations of the apparatus 10 would be included within the present invention including an apparatus 10 having a circular, regular or irregular shape with sidewall 14 extending from the bottom 12. The apparatus 10 may also be alternatively configured with a cylindrical, spherical, triangular or irregular housing for receiving the houseplant or plural houseplants 4.

A handle 30, adapted for transporting the apparatus 10, is also illustrated in FIG. 1 in which the handle 30 is generally associated with at least one of the sidewall faces 14a, 14b, 14c, 14d or the bottom 12 of the housing. A runner 18 or multiple runners 18, may be associated with the rear sidewall 14b to facilitate moving the apparatus 10 up a vertical surface (not shown) such as, but not limited to, a stair or doorway having a vertical surface.

A pair of wheels 20 are illustrated as being associated with sidewall faces, 14a and 14c and generally extending outwardly from the second sidewall face 14b. Wheels 20 being generally known, may have a number of alternative configurations or arrangements for operable movement of the apparatus 10 over horizontal surfaces (not shown), including utilizing one or more wheels 20 or circular parts adapted for rotational movement. In general, the wheels 20 provide for linear movement of the apparatus 10 along the horizontal surface for operable transport from one location to another. A drive mechanism including the wheels 20 and the handle 30 may be utilized for driving the apparatus 10 from one location to another where the wheels 20 are directed by the handle 30 to provide controlled and directed movement along the horizontal surface.

Figure 2:
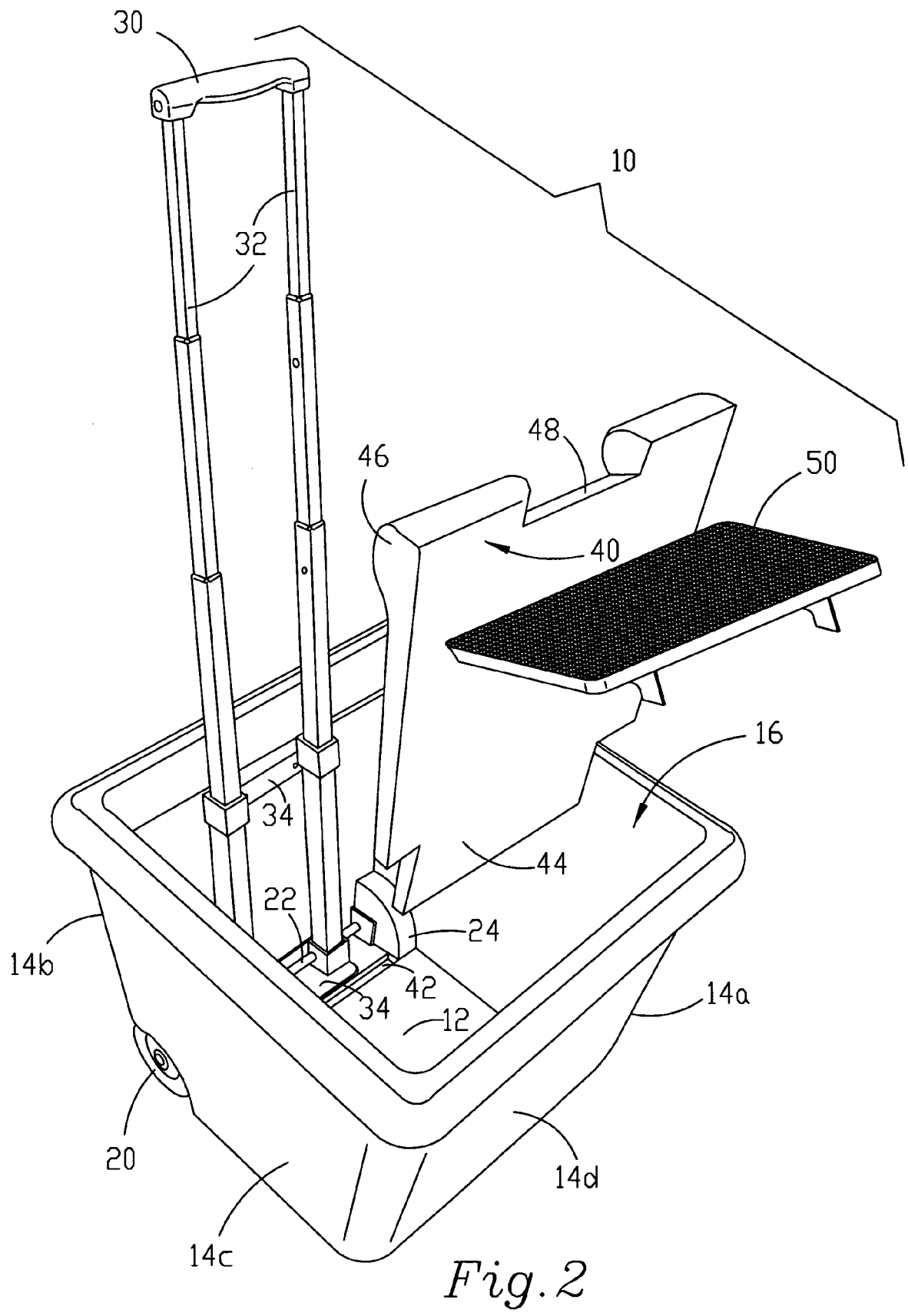
FIG. 2 is an exploded perspective view of the apparatus according to the present invention.

An arm 32, or arms 32, extending between the handle 30 and the apparatus 10 are illustrated in FIG. 2, with the handle 30 being generally secured to one end of the arms 32. The arms 32 are illustrated as being generally telescopic; however, alternative configurations may be possible for extending the handle 30 upwardly from the apparatus 10. A second end of the arms 32 is generally secured to the apparatus 10, for example, at the sidewall 14 or bottom 12. An optional mounting bracket 34 may be utilized to secure the arm 32, or arms 32, to the sidewall 14 or bottom 12 and to space the arms 32 for alignment with the handle 30. A shaft 22 extends between the wheels 20 through the arms 32, the shaft 22 providing rotateable movement of the wheels 20 during movement of the apparatus 10 along the horizontal surface. In general, the arms 32 travel between an extended configuration and a recessed configuration. In FIG. 2, the arms 32 are illustrated in the extended configuration; however, the arms 32 may also be stored in association with the apparatus sidewall 14 while in the recessed configuration.

To maintain the visual and aesthetic appearance of the apparatus 10, the apparatus may be placed in the recessed configuration with the arms 32 and associated handle 30 generally retracted within the apparatus 10. As the arms 32 are retracted, the handle 30 may be recessed into the apparatus sidewall 14, reducing the risk of accidental tipping, spilling or injury to the houseplant 4 or a nearby passerby.

FIG. 2 also illustrates a divider 40 generally adapted for placement within the opening 16 of the apparatus 10, the divider 40 being generally rectangular and extending from a first end having a lip 46 towards a second end illustrated with a notch 44, the divider 40 being adapted to mask the arms 32, the divider 40, in association with sidewall faces 14a, 14b and 14c define a sidewall compartment having a top, bottom, first and second sides, the first and second sides associated with opposite sidewall faces 14a, 14c separated horizontally along the rear or second sidewall face 14b and divider 40. The sidewall compartment bottom generally corresponds to the bottom 12. The sidewall compartment extends vertically from the bottom 12 to the opening 16 generally located at the sidewall 14 edge.

In general, the sidewall compartment houses the arms 32 in the recessed configuration and separates the arms 32 from the houseplant 4, protecting the arms 32 from exposure to any debris associated with the houseplant 4. The sidewall compartment also providing access to the arms 32 which telescopically extend outwardly from the sidewall compartment. The lip 46, being generally located at the first end of the divider 40, is adapted for positioning the divider 40 a distance from the second sidewall face 14b. The second end of the divider 40 is also generally positioned a distance along the bottom 12 from the second sidewall face 14b. Optionally, as illustrated in FIG. 2, the notch 44 associated with the second end of the divider 40 may be located within an optional receiver 42 associated with said bottom 12 for securing the divider 40 and enclosing said sidewall compartment.

While the arms 32 are positioned in the recessed configuration within the sidewall compartment, the lip 46 may cover the arms 32, maintaining the aesthetic appeal of the apparatus 10. Another alternative configuration may include configuring the lip 46 with a channel 48 adapted to receive the handle 30 in the recessed configuration. Optionally, the apparatus 10 may include wells 24 associated with the bottom 12, the wells 24 being generally adapted for housing the wheels 20.

A spacer 50, adapted for spacing the houseplant 4 a distance above the bottom 12 is also illustrated in FIG. 2, the spacer 50 being generally adapted for insulating the houseplant 4 and allowing distribution of any excess moisture from the houseplant 4 to the bottom 12. As illustrated in FIG. 2, the spacer 50 may include a generally horizontal structure with a vertical support for placement within the opening 16. Generally, the illustrated spacer 50 overlies the bottom 12 and positions the houseplant 4 a vertical distance from the bottom 12, the spacer 50 extending between opposite sidewalls faces 14a, 14c, the front or forth sidewall face 14d and the divider 40. Other alternative configurations may include a circular spacer, an irregular shaped spacer or simply distribute plural vertical supports along the bottom 12 within the apparatus 10.

In operation, the divider 40 is secured against opposite sidewall faces 14a, 14c, while the spacer 50 is generally positioned next to the divider 40, overlying the bottom 12. The houseplant 4 is then placed on the spacer 50 and the handle 30 is recessed for displaying the houseplant 4 within the apparatus 10. When the apparatus 10 is moved from one location to an alternative location, the handle 30 is raised by telescopically extending the arms 32 upwardly from the sidewall compartment, the arms 32 being positioned in the extended configuration, pivoting the apparatus 10 for rotational engagement of the wheels 20 onto the underlying horizontal surface, driving the apparatus 10 to the alternative location. Upon reaching the desired location, the apparatus 10 may be rotated towards a generally horizontal orientation, the handle 30 being lowered with the arms 32 being retracted into the recessed configuration, the arms 32 being positioned within the sidewall compartment.

Although other configurations may be possible, the spacer 50 is illustrated within the apparatus 10 in FIG. 3, the spacer 50 including a vertical support such as a pair of legs 52 for supporting the spacer 50 in a generally horizontal, level orientation a distance from the bottom 12. In addition, the spacer 50 may include an apertured surface 58, allowing for the transmission of excess moisture therethrough. Utilizing an apertured surface 58 allows excess moisture to pass from the roots of the houseplant 4 through the spacer 50 to the bottom 12, reducing fears and possible effects of over watering the houseplant 4. Optionally, a drain mechanism 60 may be provided for drainage of any excess water (not shown) from the apparatus 10 or for periodic cleaning of the interior of the apparatus 10 without tilting or overturning the apparatus 10.

An optional platform 26, is illustrated as a discontinuous horizontal structure located under the bottom 12 and generally positioned towards the forth sidewall face 14d of the apparatus 10. The platform 26 is adapted to provide a vertical distance between the apparatus 10 and the underlying horizontal surface and can be used by the drain mechanism 60 to evacuate moisture contained within the apparatus 10. The platform 26 in combination with the wheels 20 may be used to elevate the apparatus 10 for drainage of moisture or for insulating the houseplant 4 from ambient conditions.

The spacer 50 is illustrated in FIG. 4 with a lateral structure 54 which may be utilized to provide vertical support of the generally planar spacer 50 in conjunction with or instead of the legs 52. Alternatively, the legs 52 may include different configurations or a different numbers of legs 52 than those illustrated, including supporting the spacer 50 at or by the divider 40. The runner 18 is also illustrated in FIG. 4 extending from the second sidewall face 14b.

An example of the drain mechanism 60 is illustrated in FIG. 4a with a tube 62 having an opening sealed by a cap 64 in fluidic communication with the interior of the apparatus 10, the tube 62 extending downwardly from the bottom 12, the cap 64 being generally releasable and positioned over the tube opening to control the evacuation of any accumulated moisture. Drain mechanisms being generally known, may include a number of alternative configurations for use with the apparatus 10 to control evacuation of any accumulated moisture, including, providing a recessed structure (not shown) along the bottom 12 for receiving and operation of the drain mechanism 60, for evacuation of accumulated moisture from the apparatus 10 interior without interference from the underlying horizontal surface.

FIGS. 5-9 illustrate the spacer 50 with generally vertical legs 52 supporting the generally planar, apertured surface 58 a distance above the bottom 12. The substantially planer surface of the spacer 50 is adapted for receipt of the houseplant 4, while allowing excess moisture to drain from the houseplant 4. In general, excess moisture may pass from the houseplant 4 downwardly through the apertured surface 58 as shown in FIG. 6. FIGS. 7-8 depict the legs 52 supporting the substantially planar surface a vertical distance which corresponds to the vertical distance the houseplant 4 is positioned above the bottom 12 while resting on the spacer 50. The profile of an alternative embodiment of the leg 52 is illustrated in FIG. 8, in which the spacer 50 is supported by lateral structure 54; however, various configurations of the leg 52 may also be provided for supporting and positioning the spacer 50 a distance above the bottom 12. As illustrated in FIG. 6, the apertured surface 58 may optionally include a border 56 circumscribing the apertured surface 58. A cantilevered portion 70 extending upwardly from a base 72 is illustrated in FIGS. 5 and 9 in which the apertured surface 58 extends beyond the base 72, the base 72 being inset from the apertured surface 58 as indicated by the dashed line in FIG. 9. The cantilevered portion 70 may present an engaging surface for receiving the second end of the divider 40, while providing for drainage of any excess moisture through the apertured surface 58.

It will be appreciated that various other configurations and embodiments may fall within the scope of the present invention. While certain forms of the present invention have been illustrated and described herein, it is not to be limited to the specific forms or arrangement of parts described and shown.

Having thus described the invention, what is claimed as new and desired to be secured by Letters Patent is as follows:

1. A transportable planter apparatus in receipt of a houseplant the apparatus comprising:
    a housing having a bottom and a sidewall with an edge opposite said bottom,
    an opening located at said edge adapted to receive the houseplant,
    a handle associated with said housing,
    an arm extending between a recessed configuration and an extended configuration wherein said handle extends upwardly from said housing, wherein said handle is fastened to said arm,
    a receiver associated with said bottom,
    a divider adapted for placement within said opening, said divider extending from a first end towards a second end, said first end having a lip adapted for positioning said first end a distance from said sidewall, and said second end having a notch adapted for placement in said receiver, wherein said divider masks said arms, and
    wherein said lip further comprises a channel adapted to receive said handle.

\* \* \* \* \*

UNITED STATES PATENT AND TRADEMARK OFFICE
CERTIFICATE OF CORRECTION

PATENT NO. : 7,565,766 B2　　　　　　　　　　　　　　　　　　　　　　　Page 1 of 1
APPLICATION NO. : 11/650745
DATED : July 28, 2009
INVENTOR(S) : Carroll J. Boylan It is certified that error appears in the above-identified patent and that said Letters Patent is hereby corrected as shown below:

On the title page, (75) Inventor: delete "Carrol" and insert --Carroll--.

Signed and Sealed this

Twenty-ninth Day of September, 2009

David J. Kappos
*Director of the United States Patent and Trademark Office*